Dec. 20, 1932.  C. E. NAGEL  1,891,895
DRIVE SCREW
Filed Jan. 2, 1931
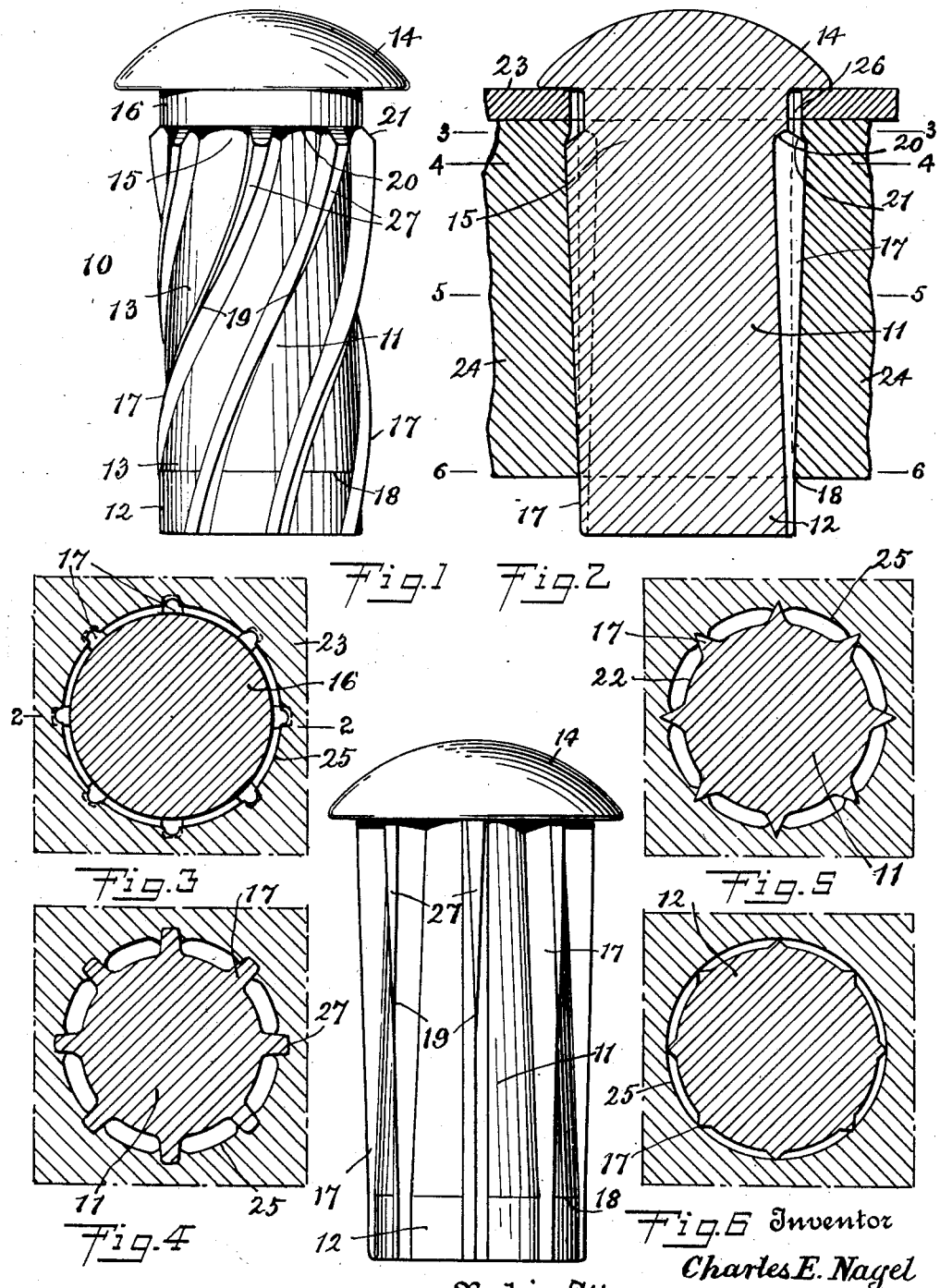
Inventor
Charles E. Nagel
By his Attorney Patented Dec. 20, 1932

1,891,895

UNITED STATES PATENT OFFICE

CHARLES E. NAGEL, OF NEW YORK, N. Y., ASSIGNOR TO SHAKE PROOF LOCK WASHER CO., OF CHICAGO, ILLINOIS, A CORPORATION OF DELAWARE

DRIVE SCREW

Application filed January 2, 1931. Serial No. 506,102.

This invention relates to improvements in metal fastening devices and more particularly to a hardened pin or drive screw provided with a high pitch thread of special construction, adapted to be driven into a drilled hole in soft metal for the purpose of fastening pieces of metal together, where the pin or screw is functioning substantially as a threaded screw or rivet, and when driven into a hole slightly larger than the entering end of the pin it will cause the pin to rotate and at the same time cut grooves into the metal and as the pin is gradually driven into the soft metal the threads of the screw will first cut grooves, which gradually get larger as the pin advances towards the head of the pin thereby causing the metal to be forced against a tapered portion of the body or stem of the pin, thereby gripping the pin and holding same in a locked position. The gripping of the pin gradually increases if the pin is subject to jar or vibration.

An object of the invention is to provide a fastening device which may be used to fasten together sheets or other soft metals by driving the pin or screw into an orifice slightly larger than the entering end of the screw, with a hammer or the like, without tapping or threading the hole.

Another object of the invention is to provide a hardened drive screw, capable of cutting its own thread into soft metal and the like, having a lower cylindrical portion of the body or stem merge with a middle conical portion, with its apex towards the head of the screw, and then again merge with a cylindrical portion adjoining the head.

Another object of the invention is to provide a hardened self-tapping drive screw in which the threads or ribs thereof having a high pitch start at the end of the pin with a sharp V thread and continue as such to about the middle of the pin, and then gradually merge into an "acme" or ratchet thread, in which the root of the thread remains the same width throughout the length of the pin, but the maximum major diameter of the thread gradually increases towards the head of the pin.

And still another object of the invention is to provide a hardened self-tapping drive screw in which the middle portion of the body or stem of the screw tapers towards the head, and when the screw is driven home the enlarged helically located threads about the body will cause the soft metal to be forced against this tapering portion, thereby gripping the screw from becoming loose. The effectiveness of this grip gradually increases if the screw is subject to a jar or vibration and to lock and more securely hold the screw against turning in the reverse direction and thereby exert an increased gripping effort upon the screw.

With these and other objects in view, the invention consists in the details of construction and arrangements of parts to be hereinafter more fully described, claimed and illustrated in the accompanying drawing in which similar numerals of reference designate corresponding parts throughout the several views in which:—

Fig. 1 represents a vertical side elevation of the drive screw having the threads or ribs helically located about the body or stem.

Fig. 2 represents a vertical cross-section taken on line 2—2 of Fig. 3 of a screw having the threads or ribs parallel with the axis of the screw joining two pieces of metal together.

Fig. 3 is a horizontal cross-section on line 3—3 of Fig. 2.

Fig. 4 is a horizontal cross-section on line 4—4 of Fig. 2.

Fig. 5 is a horizontal cross-section on line 5—5 of Fig. 2.

Fig. 6 is a horizontal cross-section on line 6—6 of Fig. 2 and

Fig. 7 is a vertical side elevation of a screw having the threads or ribs parallel with the axis of the screw and terminating at its head.

The numeral 10 designates a hardened drive screw or pin made according to my invention and is composed of a body or stem 11 having a lower cylindrical portion 12 which merges with a conical or tapering portion 13 with the apex towards the head 14 and extends upwardly to a short distance from the head in which the small end 15 of the conical portion 13 merges with a cylindrical portion 16 which is of the same diameter as the lower cylindrical portion 12. The threads 17 are located helically about the body or stem 11 and are formed of multiple high pitched threads and extend angularly only a short distance about the body of the screw.

The threads start at the lower end of the screw, the cross-section at this point and over the cylindrical body portion 12 is substantially triangular or V shaped with the same outside diameter at the crest of the threads, the whole length of said cylindrical portion of the body to a point 18. From this point towards the head 14 they begin to taper and the outside diameter at the crest gets larger as they approach the head of the screw. The threads are formed integral with the body or stem and are overhanging or outstanding from the body of the screw. The roots of the threads 17 are of the same dimensions throughout the length of the screw. The sharp V threads advance to about the middle of the screw, having the same triangular cross-section as at the end of the screw, but as the diameter at the crest of the thread is gradually increasing and the diameter of the stem is decreasing or getting closer to the centre of the screw, the height of the triangular cross-section of the thread constantly changes until they merge with an "acme" or worm thread. From this junction 19 or major diameter the crests of the threads are now beginning to get flat, and this flat is increasing and getting wider as they advance towards the head of the screw, thereby gradually changing the angularity and cross-section of the threads, relative to the axis of the screw. The threads terminate near the head at the junction 20 of the tapering portion 13 and the cylindrical portion 16 and at this point the overhang of the threads extends outside diametrically of said cylindrical portion of the screw, that is to say, that the diameters of the flattened threads measured at the apex or maximum major diameter thereof are considerably larger than the cylindrical portion 16. The ends 21 of the threads 17 are somewhat bevelled, the object thereof is to be explained later.

It will be understood that the screw will be made by the so-called rolling process, that is to say, that when the threads are formed and pressed or rolled out radially from the centre of the stem and as they gradually get higher or larger in diameter towards the head, it is evident that the valleys 22 therebetween are getting deeper and deeper, thereby forming the conical portion of the stem.

By referring to Fig. 2, it will be seen that the screw 10 has been driven onto two pieces of soft metal 23—24 for the purpose of fastening them together. The threads 17 are shown straight or parallel with the axis of the screw for the purpose of more clearly illustrating the invention. By referring to Fig. 6, it will be seen that a hole 25 has been drilled in the metals which is slightly larger than the apex diameter of the V shaped threads at the end of the screw. The threads at this point are serving as a pilot or entering end for the screw, or in other words, the hole is drilled large enough so that the pilot end of the screw will just enter the hole. The screw is hardened so that the threads can cut their way into or through the substance through which the screw or pin may be driven. When the screw is driven into a hole, prepared for it, with a hammer or the like, and when the enlarged threads come in contact with the edges of the hole 25, it has a tendency to rotate the screw and at the same time during the driving action, the threads will enter and force themselves into the soft metal thereby causing the metal to flow at the opposite sides into the valleys 22, between the threads 17, into a position between the tapering stem of the screw and the edges of the hole, thereby effectively locking the pin from being withdrawn. The frictional action of the metal thus engaging the tapering section of the screw or pin in a seated position. As the pin rotates while being driven home, the rotation corresponds to a degree to the pitch of the threads and will cause the metal to flow sufficiently to clog between the threads into the valleys 22 which form the tapering portion of the screw, thereby resisting the withdrawal of the same to the extent of the resistance of the head of a rivet.

Referring to Fig. 2, it will be seen that the screw 10 has been driven through the metal plates 23—24, leaving the end of the screw projecting outside the metal plate 24. The threads have penetrated the soft metal and forced the metal to flow back and into the valleys 22 forming the tapering portion of the screw 10 thereby clogging up the space between said tapering portion and the edges of the hole 25 thereby locking the screw in position. The upper end or shoulder 21 of the thread 17 has also been embedded in the metal and it is evident that this shoulder has partly passed through the plate 23, leaving an opening 26 and that the resiliency of the metal above the shoulder has a tendency to partly close up this opening 25, thereby locking the screw or pin in position.

By referring to Fig. 3, it will be seen that the resiliency of the metal of plate 23 has crowded the metal all around the upper end of the shoulder 21 of the thread 17, thereby preventing the screw from becoming loose and resisting its withdrawal. This illustration is greatly exaggerated, but the object thereof is to show how the screw is locked in position.

By referring to Fig. 7 which shows a somewhat modified form of the screw or pin, but with this difference however, that instead of the threads being helically located about the body, they are made straight or parallel with the axis of the screw and instead of the threads terminating a short distance from the head, they run the full length of the screw up to the head 14. The formation of the threads of the screw are substantially the same as before described. The flat portion 27 thereof terminates at the head and the tapering portion of the body extends up to the head 14.

By referring to Figs. 4 and 5, it will be seen that the threads 17 have penetrated the soft metals and forced same towards the centre of the screw with the result as before described.

I claim:—

1. A hardened screw comprising a cylindrical stem having a head and a blunt lower end, said stem being tapered with its smallest diameter adjacent the head, and a helical thread located about the stem to cut a groove in a metal article, said thread including a wood screw configuration gradually merging into a ratchet thread as it ascends, the major diameter of the thread increasing toward the head.

2. A drive screw comprising a stem having a head with a blunt lower end, said stem having its smallest diameter adjacent its head, and a series of threads of V shaped configuration starting at the blunt end and gradually merging into a ratchet shaped configuration as they ascend for cutting a groove in a metal article, the threads extending upward in tapered lines from the lower end to the head the maximum major diameter of the thread gradually increasing toward the head.

Signed at New York in the county of New York and State of New York this 30th day of December, 1930.

CHARLES E. NAGEL.